C. F. JENKINS.
TIRE REPAIR DEVICE.
APPLICATION FILED DEC. 24, 1915.
1,174,254.
Patented Mar. 7, 1916.
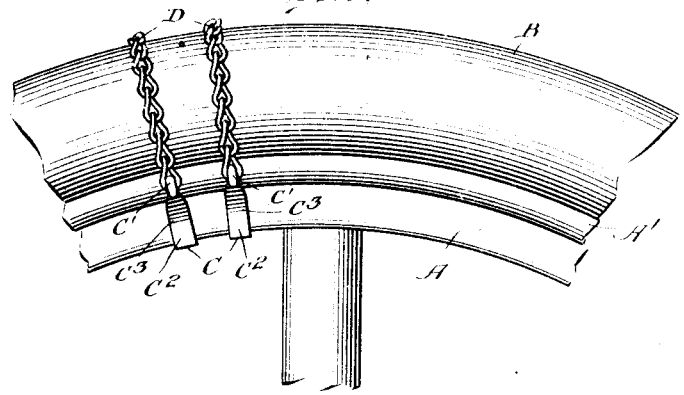
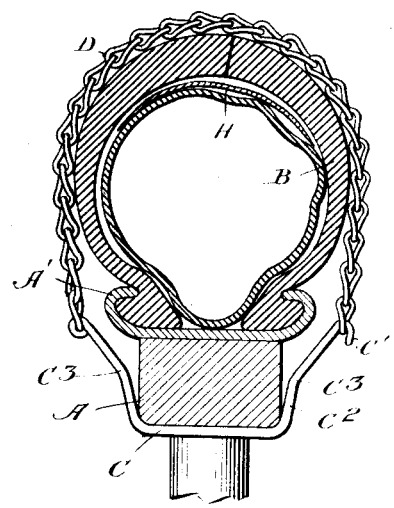
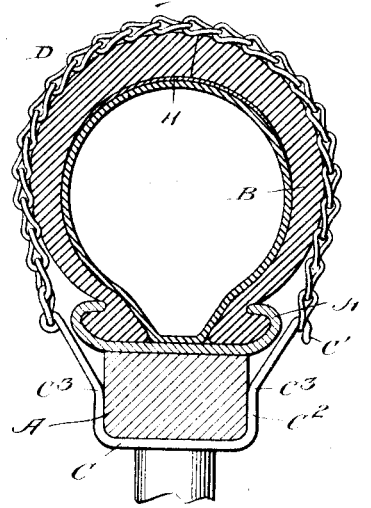
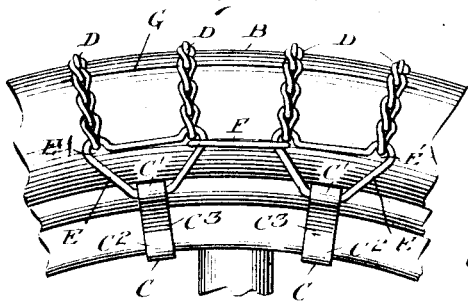
Witness
Edwin L. Bradford
Inventor
C. F. Jenkins
By
Wallace Greene
Attorney

UNITED STATES PATENT OFFICE.

CHARLES FRANCIS JENKINS, OF WASHINGTON, DISTRICT OF COLUMBIA.

TIRE-REPAIR DEVICE.

1,174,254.  Specification of Letters Patent.  Patented Mar. 7, 1916.

Application filed December 24, 1915. Serial No. 68,526.

*To all whom it may concern:*

Be it known that I, CHARLES FRANCIS JENKINS, a citizen of the United States, residing at Washington, in the District of Columbia, have invented certain new and useful Improvements in Tire-Repair Devices, of which the following is a specification, reference being had therein to the accompanying drawing.

My invention relates to improvements in tire repair devices of the class in which the injured segment of the tire is bound by one or more chains engaging the wheel and passing around the outer portion of the tire. Certain devices of this kind involve attaching the chains to hooked members which pass down between the tire and rim and engage overhanging portions of the latter. Other devices involve securing patches to members which pass around the rim.

Practically, it is difficult to insert hooks between the tire and rim, and in any type of device it is very desirable that the repair devices should not crawl along tire, felly or rim under the material pull to which they are subjected in use. It is also practically indispensable that the devices should not when used seriously disfigure the vehicle. With these facts in view, I hold the chains by devices which pass around the rim and which grip it with great force when the tire is fully inflated.

In the accompanying drawings, Figure 1 is a side view of a wheel rim and tire provided with one form of my devices. Fig. 2 is a cross section showing the tire deflated but with the repair devices attached. Fig. 3 is a view similar to Fig. 2, the tire being fully inflated. Fig. 4 is a view similar to Fig. 1 showing a modification.

In Figs. 1, 2, 3, A, A' represent the felly and rim, respectively, B a pneumatic tire, borne thereby, and C U-shaped spring metal clips passing around, and fitting, the inner side of the felly and each having one end permanently engaging one end of a chain D which passes around the tire and engages an open hook C' at the opposite end of the same clip. The clip arms C² normally diverge from the felly, as shown in Fig. 2, and each is preferably bent more sharply outward near its middle point C³. The tire being deflated and the usual internal patch H being inserted a suitable number of chains and clips are put in place with the chains passing over the injured part and drawn down closely and engaged with their clips. The tire being then inflated, the chains are pushed outward with great force by the tire wall and the divergent arms of the clip correspondingly grip the felly so that there is no slipping on the felly to mar the felly or to throw the chains and clips out of proper relation, where chains lie flat and press evenly upon the tire.

In most cases of tire injury it is desirable to apply several chains, and practically it is found desirable to connect chains in sets, as shown in Fig. 4, for example. In that figure sets of parallel chains are connected to one side of somewhat triangular links E each engaging one of the clips. The side of the link engaged by the chains is provided with slight depressions E' for the chains so that in service they may not move toward each other. Each set may be flexibly connected to other sets by links F, two sets being shown in the figures as repairing a long cut G.

It is desirable that the chains be of such form that under pressure they sink into the body of the tire and prevent separation of parts alongside a cut, for example.

What I claim is:

1. In devices of the class described, the combination with a clip adapted to pass around the inner side of a felly and having on one side an arm normally diverging from the side of the felly and adapted to press against that side when bent inward; of a chain member having one end secured to one end of said clip and adapted to pass around a tire and engage the free opposite end of said clip.

2. In devices of the class described, the combination with a U-like clip to pass around the inner side of a felly with its arms normally divergent from the lateral faces of the same and adapted to grip said felly when said arms are bent inward; of chain devices for passing closely around a tire carried by said felly and connecting the ends of said arms; whereby, the devices being in place on a wheel, inflation of the tire will cause said arms to grip the felly.

3. In devices of the class described, the combination with a plurality of U-shaped clips adapted to pass around the inner side of a felly and having normally divergent resilient arms adapted to grip a felly when pressed inward, of sets of chain devices adapted to pass closely around a deflated tire and connect opposite ends of the clips, respectively, and links flexibly connecting said sets on each side of the tire and at some distance from its tread surface.

In testimony whereof I affix my signature in presence of a witness.

CHARLES FRANCIS JENKINS.

Witness:
JAMES L. CRAWFORD.